US009007339B2

(12) United States Patent
Smith et al.

(10) Patent No.: US 9,007,339 B2

(45) Date of Patent: Apr. 14, 2015

(54) METHOD FOR IMPLEMENTING TOUCH SCREEN ON DISPLAY PANEL AND ASSOCIATED APPARATUS

(71) Applicant: MStar Semiconductor, Inc., Hsinchu Hsien (TW)

(72) Inventors: Sterling Smith, Zhubei (TW); Chi-Kang Liu, Zhubei (TW); Guo-Kiang Hung, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 119 days.

(21) Appl. No.: 13/754,984

(22) Filed: Jan. 31, 2013

(65) Prior Publication Data

US 2013/0194231 A1 Aug. 1, 2013

(30) Foreign Application Priority Data

Feb. 1, 2012 (TW) ............................ 101103306 A

(51) Int. Cl.

*G06F 3/045* (2006.01)
*H05B 1/02* (2006.01)
*G06F 3/044* (2006.01)
*G06F 3/041* (2006.01)

(52) U.S. Cl.

CPC .............. *G06F 3/044* (2013.01); *G06F 3/0412* (2013.01); *G06F 3/0416* (2013.01)

(58) Field of Classification Search

USPC ........................................................ 345/174

See application file for complete search history.

(56) References Cited

U.S. PATENT DOCUMENTS

2009/0167718 A1* 7/2009 Lee et al. ...................... 345/174
2012/0038585 A1* 2/2012 Kim ............................. 345/174

FOREIGN PATENT DOCUMENTS

TW 201117185 A 5/2011

OTHER PUBLICATIONS

Taiwan Office Action, Jul. 2, 2014, 8 pages.

* cited by examiner

*Primary Examiner* — Charles V Hicks

(74) *Attorney, Agent, or Firm* — Edell, Shapiro & Finnan, LLC

(57) ABSTRACT

A method for implementing a touch screen on a display panel and associated apparatus is provided. Cross locations of source lines and gate lines of the display panel are arranged for sensing a user touch control. In a sensing phase for sensing touch control, capacitance changes due to the touch control are sensed via the source lines. In a display phase, driving electricity is transmitted via the source lines for driving the display panel to display.

10 Claims, 5 Drawing Sheets

METHOD FOR IMPLEMENTING TOUCH SCREEN ON DISPLAY PANEL AND ASSOCIATED APPARATUS

This application claims the benefit of Taiwan application Ser. No. 101103306, filed Feb. 1, 2012, the disclosure of which is incorporated by reference herein in its entirety.

BACKGROUND

1. Technical Field

The present invention relates in general to a method for implementing a touch screen on a display panel and associated apparatus, and more particularly to a method for implementing an integrated, lost-cost touch screen utilizing an existing structure of a display panel and associated apparatus.

2. Description of the Related Art

A touch screen integrated with a display function for image information and a touch control for touch sensing is one of the most prevalent human-machine interfaces in the modern information world. It is therefore a research and development focus of electronic manufacturers to offer a solution of a low-cost touch screen.

SUMMARY

To lower the cost of a touch screen, the disclosure is directed to a method for implementing a touch screen using an existing structure of a display panel and an associated apparatus.

The disclosure provides a display panel. The display panel comprises a plurality of first lines S(j), a plurality of second lines G(i) and a plurality of display units D(i, j). Each display unit D(i, j) is coupled to the corresponding first line S(j) and the corresponding second line G(j). Each first line S(j) and each second line G(i) are insulated from each other and cross each other at a corresponding cross location Z(i, j).

The disclosure further provides a control system. The control system comprises a plurality of drivers Sd(j), a plurality of second drivers Gd(i), a plurality of switch circuits Sx(j), a plurality of second switch circuits Gx(i), a plurality of capacitance sensing units Sc(j) and a plurality of auxiliary units Gc(i). Each switch circuit Sx(j) is coupled between the corresponding first line S(j), driver Sd(j) and capacitance sensing unit Sc(j). Each switch circuit Gx(i) is coupled between the corresponding second line G(i), second driver Gd(i) and auxiliary unit Gc(i).

The disclosure yet provides a control method. In a sensing phase, via at least one of the first lines S(j), capacitance at the at least one corresponding cross location Z(i, j) is sensed. In a display phase, via at least one of the first lines S(j), at least one corresponding display unit D(i, j) is driven to display. For example, each display unit D(i, j) comprises a transistor T(i, j), which is controlled by the second line G(i) to selectively conduct the display unit D(i, j) to the corresponding first line S(j). In the display phase, each second switch circuit Gx(i) conducts the second line G(j) to the second driver Gd(i), which then turns on the transistor T(i, j) of the display unit D(i, j); the switch circuit Sx(j) conducts the first line S(j) to the driver Sd(j), which is then driven via the first line S(j) to display.

In the sensing phase, each second switch circuit Gx(i) conducts the second line G(i) to the auxiliary unit Gc(i) to turn off the transistor T(i, j), and the switch circuit Sx(i) conducts the first line S(j) to the capacitance sensing unit Sc(j) to measure the capacitance at the cross location Z(i, j).

The disclosure further provides a touch screen comprising a plurality of holes at a common voltage conductive layer of the display panel. Positions of the holes are associated with the cross locations. A planar projection of each hole is at least partially overlapped with a planar projection of the corresponding cross location to reinforce the capacitance sensing capability at the cross location.

The above and other aspects of the invention will become better understood with regard to the following detailed description of the preferred but non-limiting embodiments. The following description is made with reference to the accompanying drawings.

In the following detailed description, numerous specific details are set forth in order to provide a thorough understanding of the disclosed embodiments.

DETAILED DESCRIPTION

Figure 1:
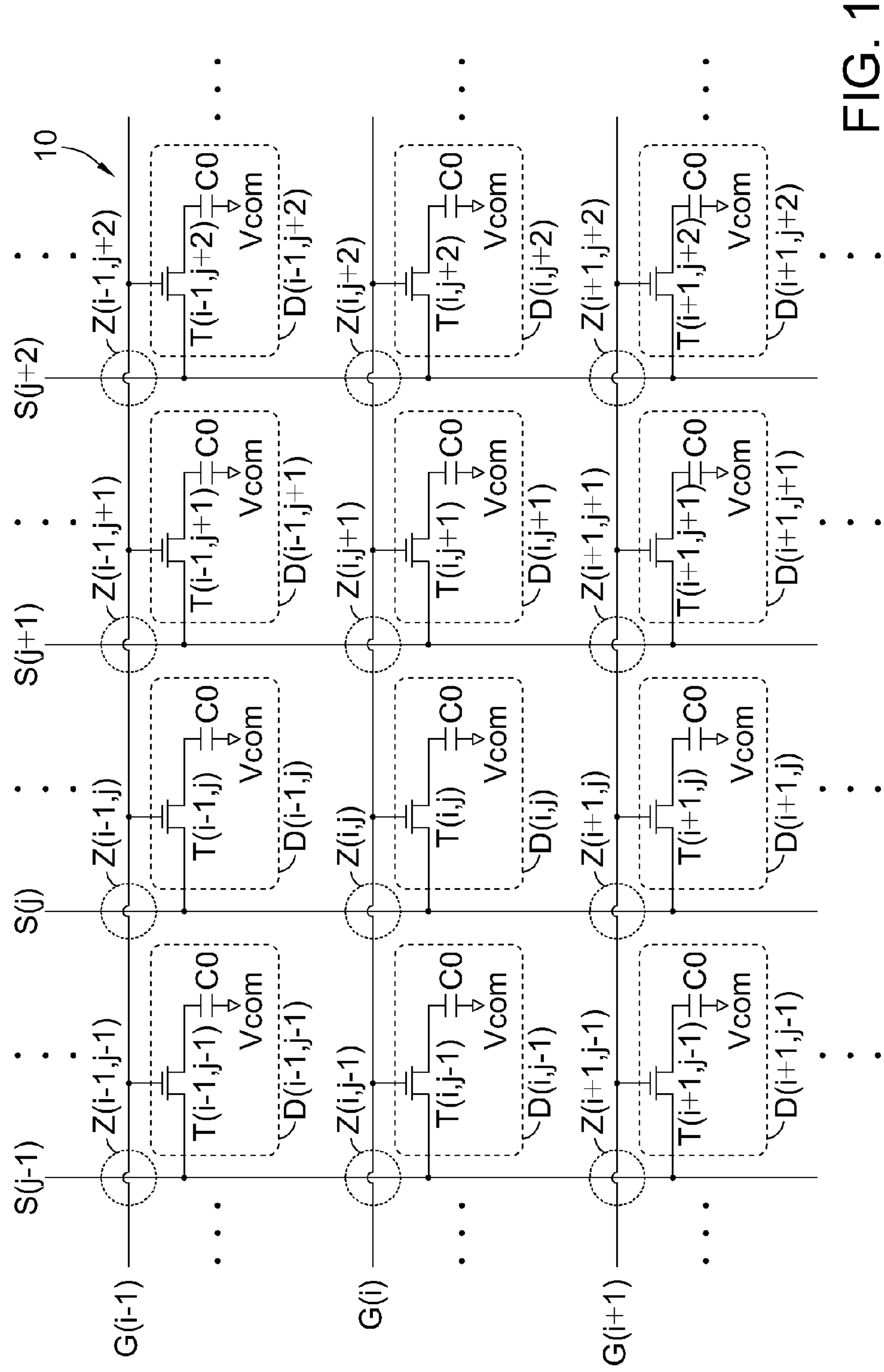
FIG. 1 is a diagram of a display panel according to one embodiment of the present invention.

FIG. 1 shows a display panel 10 according to one embodiment. The display panel 10 comprises a plurality of display units, as indicated by display units D(i−1, j−1) to D(i+1, j+2) for example. Each of the display units displays a sub-pixel. For example, the display units D(i, j), D(i, j+1) and D(i, j+2) are three primary-color sub-pixels of a same pixel. The display units D(i−1, j−1) to D(i+1, j+2) are arranged in a matrix along a plurality of vertical lines G(i−1) to G(i+1) and a plurality of horizontal lines S(j−1) to S(j+2). Each display unit D(i, j) is coupled to the corresponding lines S(j) and G(i). Each line S(j) is insulated from each line G(j), and crosses each line G(j) at a corresponding cross location (i, j). Thus, the line G(i) and the line S(j) form an equivalent coupling capacitance at the corresponding cross location Z(i, j).

As shown in FIG. 1, the display unit D(i, j) comprises a transistor T(i, j) and a capacitor C0. For example, the display unit D(i, j) is a liquid crystal display (LCD) unit. The transistor T(i, j) is a thin-film transistor with a source coupled to the line S(j), a gate coupled to the line G(i) and a drain coupled to a display electrode of the display unit D(i, j). For example, the display electrode is formed by a transparent indium tin oxide (ITO) conductive layer. The liquid crystal is filled between the display electrode and another electrode transmitting a common voltage Vcom to form the capacitor C0 in the display unit D(i, j). Each line G(i) and each line S(j) may be respectively regarded as a gate line and a source line. The transistor T(i, j) is controlled by a level of the line G(i) to selectively conduct the display unit D(i, j) to the corresponding line S(j).

Figure 2:
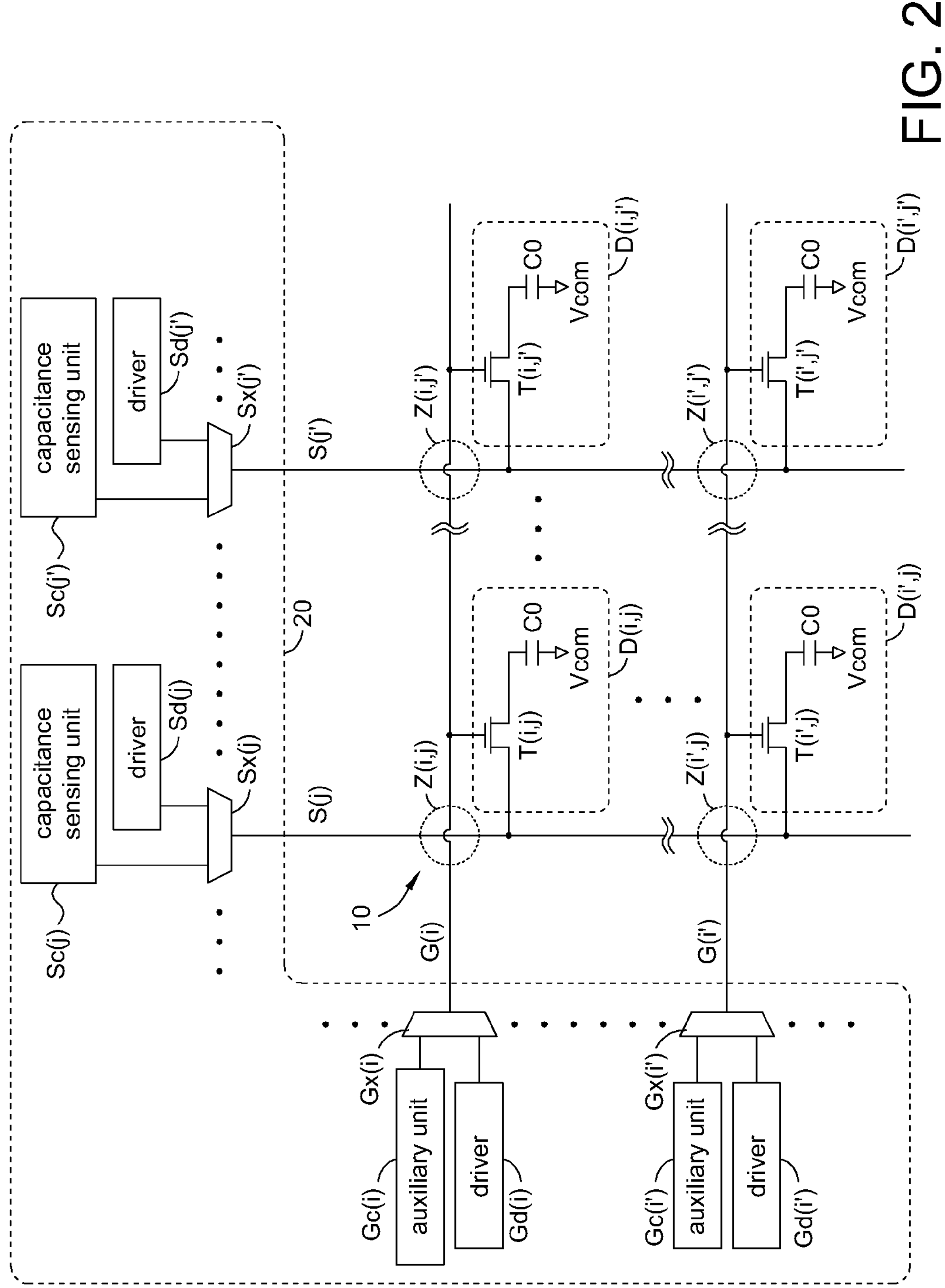
FIG. 2 is a diagram of a control system for controlling the display panel in FIG. 1 according to one embodiment of the present invention.
Figure 3:
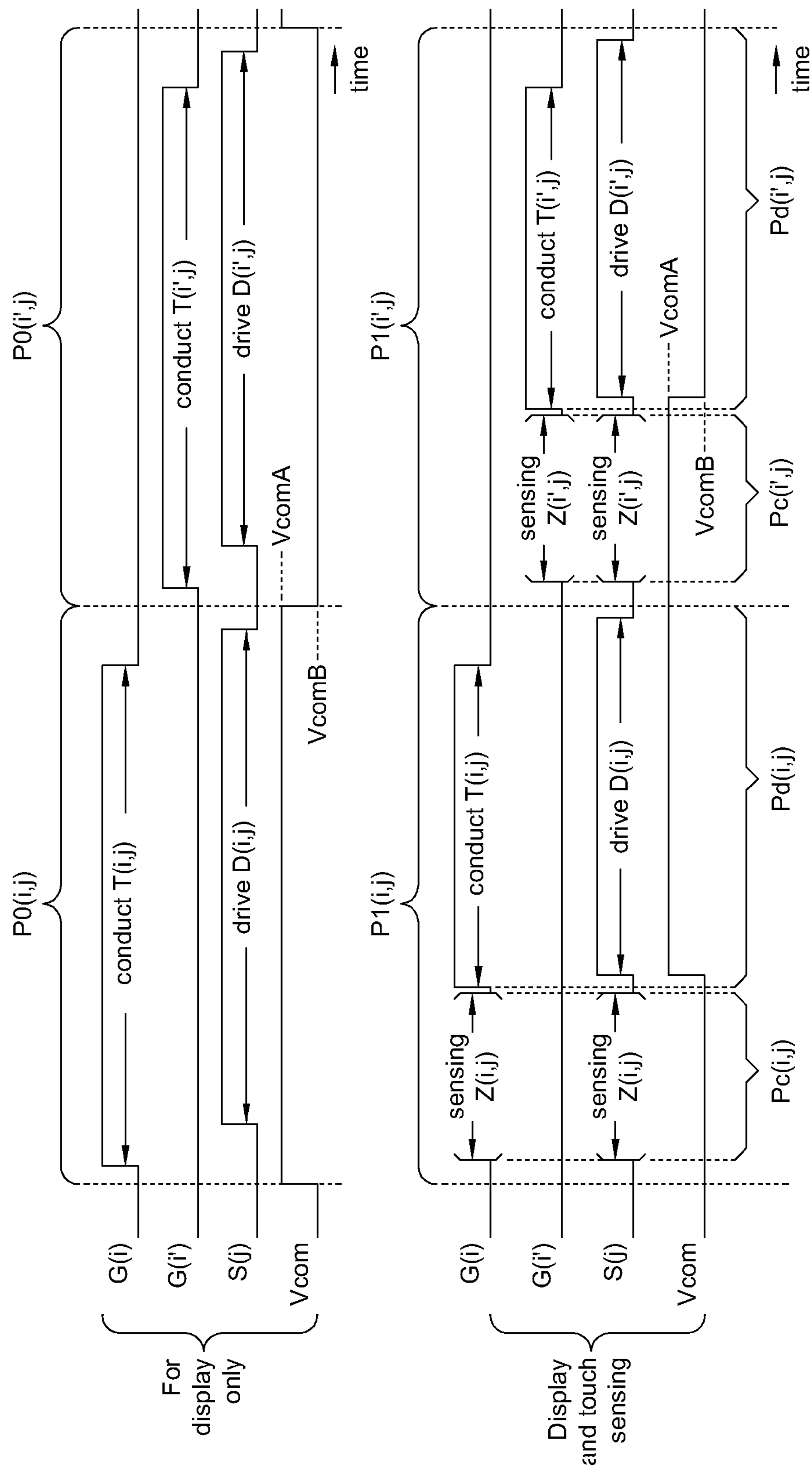
FIG. 3 is a diagram of an operating timing of the control system in FIG. 2 according to one embodiment of the present invention.

Please refer to FIGS. 2 and 3. FIG. 2 shows a schematic diagram of the display panel 10 cooperating with a control system. FIG. 3 shows an operating timing of the control system 20, with a horizontal axis representing the time. To correspond to the lines G(i) and G(i') and the lines S(j) and S(j') in the display panel 10, the control system 20 comprises a plurality of drivers Sd(j) and Sd(j') as well as drivers Gd(i) and Gd(i'), switch circuits Sx(j) and Sx(j') as well as switch circuits Gx(i) and Gx(i'), capacitor sensing units Sc(j) and Sc(j'), and auxiliary units Gc(i) and Gc(i'). In view of the line S(j), the switch circuit Sx(j) is coupled between the line S(j), the driver Sd(j) and the capacitance sensing unit Sc(j). In view of the line G(i), the switch circuit Gx(i) is coupled between the line G(i), the driver Gd(i) and the auxiliary unit Gc(i).

To fulfill both display and touch sensing functions, the control system 20 temporally and periodically controls the display panel 10 to perform a sensing phase and a display phase. In the sensing phase, the control system 20 senses the capacitance at the cross location Z(i, j) via the line S(j). In the display phase, the control system 20 drives the corresponding display unit D(i, j) to display via the line S(j).

The timing that the control system 20 implements a touch screen by the display panel 10 is shown in the lower part of FIG. 3. The control system 20 respectively controls the lines G(i) and G(i') (e.g., i'=i+1) of the corresponding line S(j) in periods P1(i, j) and P1(i', j). Each period P1(i, j) includes a display phase Pd(i, j) and a sensing phase Pc(i, j).

In the display phase Pd(i, j) of the period P1(i, j), the switch circuit Gx(i) of the control system 20 conducts the driver Gd(i) to the line G(i), and the driver Gd(i) then turns on the transistor T(i, j) of the display unit D(i, j). When the transistor T(i, j) is turned on, the switch circuit Sx(j) also conducts the driver Sd(j) to the line S(j). Through the turned on transistor T(i, j), the driver Sd(j) transmits sub-pixel data, representing a color level to be displayed by the display unit D(i, j), corresponding to the display unit D(i, j) to the capacitor CO via the line S(j), so as to drive the display unit D(i, j) to display. In other words, the drivers Gd(i) and Gd(i') are gate drivers and the drivers Sd(j) and Sd(j') are source drivers for driving the display panel 10 to display.

In the sensing phase Pc(i, j) of the period P1(i, j), the switch circuit Gx(i) switches the auxiliary unit Gc(i) to conduct to the line G(i). The switch circuit Sx(j) then conducts to the line S(j) via the capacitor sensing unit Sc(j) to measure the capacitance at the cross location Z(i, j). By providing an appropriate voltage to the transistor T(i, j) via the line G(i), the auxiliary unit Gc(i) maintains the transistor T(i, j) in a turned off state to allow the display unit D(i, j) to continue to display according to the sub-pixel data maintained by the capacitor CO. Meanwhile, the voltage provided by the auxiliary unit Gc(i) on the line G(i) also triggers capacitance-to-charge conversion, such that the capacitance sensing unit Sc(j) is able to measure the equivalent capacitance at the cross location Z(i, j).

As the period P1(i, j) ends, the control system 20 proceeds to another P1(i', j). Under timing control of the switch circuits Gx(i') and Sx(j), the drivers Gd(i') and the auxiliary unit Gc(i') respectively cooperate with the drivers Sd(j) and the capacitance sensing unit Sc(j) to jointly perform operations of the display phase Pd(i', j) and the sensing phase Pc(i', j). Thus, display is performed at another display unit D(i', j), and the capacitance change resulted by touch control is measured at another cross location Z(i', j).

In one embodiment, the switch circuits Sx(j) and Sx(j'), the drivers Sd(j) and Sd(j'), and capacitance sensing units Sc(j) and Sc(j') at different lines S(j) and S(j') operate simultaneously. That is to say, while operations of the period P1(i, j) are performed on the line S(j), operations of the period P1(i, j') (not shown in FIG. 3) are performed on the line S(j'), so as to at the same time respectively sense the capacitance at the cross locations Z(i, j) and Z(i, j') by the capacitance sensing units Sc(j) and Sc(j'), and respectively drive the display units D(i, j) and D(i, j') by the drivers Sd(j) and Sd(j') to display.

In each period P1(i, j), an order of the sensing phase Pc(i, j) and the display phase Pd(i, j) may be exchanged. For example, in the period P1(i, j), the display phase Pd(i, j) is performed before the sensing phase Pc(i, j).

In FIG. 3, the common voltage Vcom switches between levels VcomA and VcomB. Preferably, the sensing phases Pc(i, j) are performed when the common voltage Vcom is maintained at a fixed level to prevent the level switching of the common voltage Vcom from desirably affecting the touch sensing.

In another mode, the control system 20 may also operate the display panel 10 for image display only, with a control timing being as shown in the upper part of FIG. 3. The display phase is present in each of the periods P0(i, j) and P0(i', j) of the lines S(j) and the corresponding lines G(i) and G(i'). In the display phase, the switch circuits Gx(i) and Gx(i') respectively keep conducting the drivers Gd(i) and Gd(i') to the lines G(i) and G(i'), the switch circuit Sx(j) keeps conducting the driver Sd(j) to the line S(j), so as to respectively drive the display units D(i, j) and D(i', j) in the periods P0(i, j) and P0(i', j). For example, the lengths of the periods P0(i, j) and PO are the same or different.

That is to say, through the timing control of the control system 20, the display panel 10 is able to flexibly operate in different modes—the display panel is able to implement both touch sensing and display functions, or simply implementing the display function without the touch sensing function, or simply implementing the touch sensing function without the display function (i.e., cancelling the display phase in the periods), with a same display controller. The control system 20 is also capable of implementing different modes for different parts of the display panel 10. For example, display is performed at the display units D(i, j) on the lines G(i) and touch sensing is performed at the cross locations Z(i, j), and only the display units D(i', j) on the lines G(i') are driven to display while touch sensing is not performed at the cross locations Z(i', j).

Figure 4:
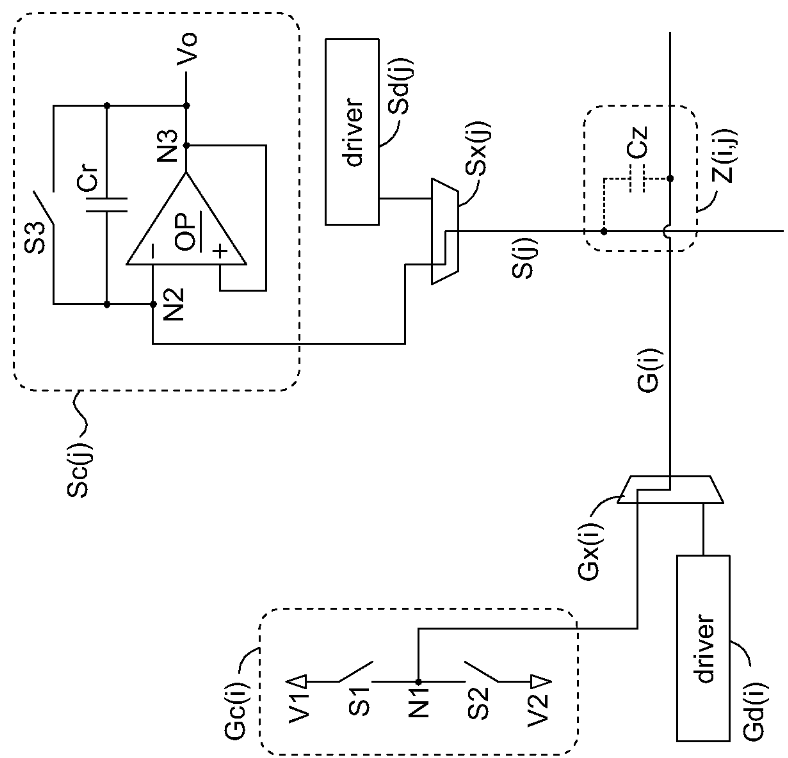
FIG. 4 is a circuit diagram of a control system according to one embodiment.

FIG. 4 shows a circuit diagram of the auxiliary unit Gc(i) and the capacitance sensing unit Sc(j). The auxiliary unit Gc(i) is coupled to the switch circuit Gx(i) at a node N1, and comprises switches S1 and S2 to selectively conduct the node N1 to either a voltage V1 or a voltage V2. The capacitance sensing unit Sc(j) comprises an operational amplifier OP, e.g., a differential operational amplifier. The operational amplifier OP has an input terminal coupled to the switch circuit Sx(j) at a node N2, and another input terminal for feeding back to a node N3. For corresponding to a switch S3 and a capacitor Cr between the nodes N2 and N3, the operational amplifier OA provides an (analog) output signal Vo at an output terminal of the node N3.

In the sensing phase, the auxiliary unit Gc(i) and the capacitor sensing unit Sc(j) jointly form a capacitance to a voltage conversion circuit for converting the capacitance of an equivalent capacitor Cz at the cross location Z(i, j) to a voltage of the output signal Vo. During operations of the auxiliary unit Gc(i) and the capacitance sensing unit Sc(j), the sensing phase is divided into three sub-phases. In the first sub-phase, the switch S1 conducts the voltage V1 to the node N1, while the switches S2 and S3 are turned off. In the second sub-phase, the switch S1 is turned off, whereas the switch S2 conducts the voltage V2 to the node N1 while the switch S3 stays off. Thus, a difference between the voltages V1 and V2 reflects the capacitance of the capacitor Cz to charge, and transfers the charge to the capacitor Cr to provide the corresponding output signal Vo. In the third sub-phase, the switch S3 is turned on to reset the charge in the capacitor Cr. The voltages V1 and V2 may be lower than a threshold voltage of the transistor T(i, j), so that the transistor T(i, j) is kept turned off in the sensing phase. The output signal Vo may be converted to a digital signal by an analog-to-digital converter (not shown).

Alternatively, structures of the auxiliary unit Gc(i) and the capacitance sensing unit Sc(j) may be exchanged. That is to say, the capacitance sensing unit, the driver Gd(i) and the switch circuit Gx(i) are grouped corresponding to the line G(i), and the auxiliary unit, the driver Sd(j) and the switch circuit Sx(j) are grouped corresponding to the line S(j).

In another embodiment, a plurality of lines G(i) are directly coupled to the corresponding drivers Gd(i) to perform display only without touch sensing. For example, when a remainder of the subscript i divided by 3 is 0, the line G(i) in the control system 20 is provided with a corresponding switch circuit Gx(i) and the auxiliary unit Gc(i); when a remainder of the subscript i divided by 3 is 1 or 2, the line G(i) is directly coupled to the corresponding driver Gd(i) in the control system 20. Alternatively, not all the lines S(j) are provided with the switch circuits Sx(j) and the capacitance sensing units Sc(j).

The control system 20 may be integrated in a chip, e.g., in a timing controller of a display panel. In another embodiment, the switch circuits Gx(i) and the corresponding auxiliary units Gc(i) and drivers Gd(i) are integrated to a gate driver, and the switch circuits Sx(j) and the corresponding capacitance sensing units Sc(j) and drivers Sd(j) are integrated to a source driver, with the switching timing between the sensing phase and the display phase of the switch circuits Sx(j) and Gx(j) being controlled by a timing controller.

Since an arrangement density of the lines G(i) and S(j) is quite high, a touch sensing resolution obtained from touch sensing by the cross locations Z(i, j) correspondingly has a high precision. Preferably, a quantized resolution of touch sensing may be increased by combining sensing results at a plurality of neighboring cross locations. For example, assume that touch sensing results (e.g., analog-to-digital converted results from the output signal Vo) at the cross locations Z(i, j) are original m-bit digital signals. By combining digital sensing results at the cross locations Z(i, j), Z(i, j'), Z(i', j) and Z(i', j'), e.g., i'=i+1, f=j+1, (m+2)-bit digital sensing result is then provided by the 2*2 cross-location region to increase the quantized resolution as well as to reduce the resolution in analog-to-digital conversion.

Figure 5:
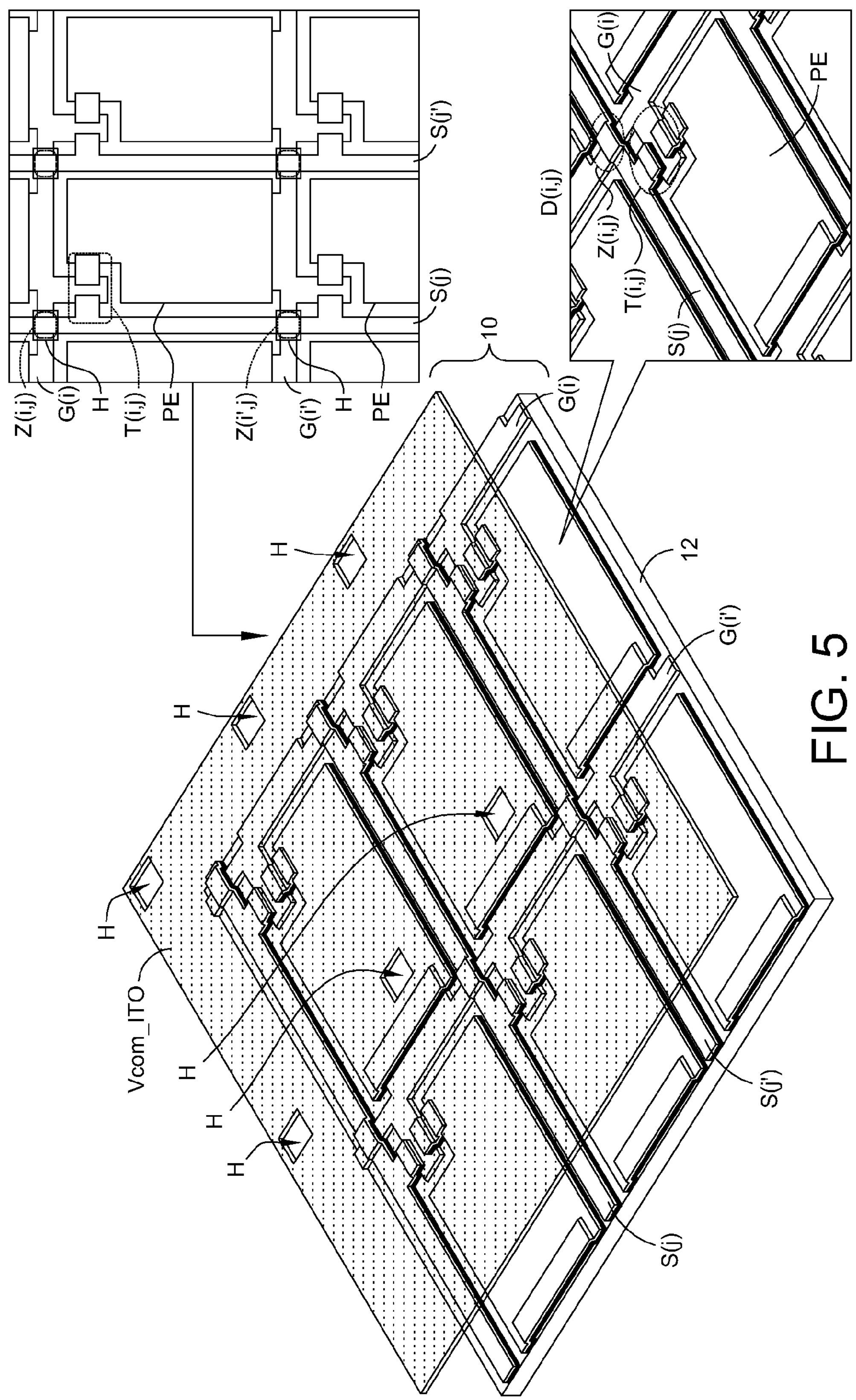
FIG. 5 is a diagram of display panel according to one embodiment of the present invention.

FIG. 5 shows a structure of the display panel 10, e.g., a twisted nematic (TN) LCD panel. The display panel 10 may be formed on a substrate, e.g., a glass substrate. On the substrate 12, each of the display units D(i, j) is coupled to a display electrode DE via the corresponding transistor T(i, j) to form a terminal of the capacitor C0 (in FIGS. 1 and 2). The display panel 10 further comprises a conductive layer Vcom_ITO, which overlays the transistors T(i, j) of the display units D(i, j) and is shared by the display units D(i, j) to conduct the common voltage Vcom, thereby forming the other terminal of the capacitor C0. For example, the display electrodes PE are formed by a transparent ITO conductive layer, and the conductive layer Vcom_ITO forms another transparent ITO conductive layer. When applying the technique of the disclosure for implementing a touch screen by using such display panel, since the conductive layer Vcom_ITO overlays all the display units D(i, j) of the display panel 10, touch sensing at the cross locations Z(i, j) may be undesirably affected if the cross locations Z(i, j) are also overlaid. Preferably, the conductive layer Vcom_ITO is provided with a plurality of holes H penetrating through the conductive layer Vcom_ITO. Each of the holes H corresponds to one cross location Z(i, j) to facilitate the cross location Z(i, j) in sensing the capacitance changed triggered by touch sensing. For example, as shown in an upper-right diagram in FIG. 5, a planar projection of the holes H at the substrate 12 is at least partially overlapped with a planar projection of the cross locations Z(i, j), so as to reveal the cross locations Z(i, j) from the overlaying of the conductive layer Vcom_ITO. For example, the holes H are arbitrarily-shaped, shapes of the holes H corresponding to different cross locations are the same or different, and certain cross locations may not be provided with the holes. For example, for certain cross locations that are not utilized for touch sensing, no corresponding holes are provided. The holes are capable of reinforcing the touch sensing capability of the display panel 10 while also enhancing light transmittance of the display panel 10.

In an alternative embodiment, the common voltage conductive layer is not required for overlaying the electrodes in another type of display panel, and the cross locations of the lines are directly revealed to sense external capacitance changes. Such display panel does not need the holes, and may directly apply the technique of the disclosure to implement a touch screen. For example, an in-plane switching (IPS) LCD panel and an organic light-emitting diode (OLED) display panel is the type of display panel described above, and are suitable for applying the technique of the disclosure for implementing a touch screen.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for a touch screen, applied to a display panel comprising a plurality of first lines, a plurality of second lines and a plurality of display units, each first line and each second line being insulated from each other and crossing each other at a corresponding cross location, each display unit being coupled to one of the first lines and one of the second lines; the method comprising:

in a sensing phase, sensing capacitance at one of the cross locations via at least one of the first lines; and in a display phase, driving at least one corresponding display unit via the at least one of the first lines to display.

2. The method according to claim 1, wherein each display unit comprises a corresponding transistor controlled by a corresponding second line of said each display unit to selectively conduct said each display unit to the corresponding first line; the method further comprising:

in the display phase, turning on the corresponding transistor of the corresponding display unit via at least one of the second lines, and driving the corresponding display unit via the corresponding first line of the corresponding display unit to display; and in the sensing phase, turning off the corresponding transistor of the corresponding display unit via at least one of the second lines, and sensing the capacitance at the cross location corresponding to the first line and the second line via the corresponding first line of the corresponding display unit.

3. The method according to claim 1, wherein in the sensing phase, at least one of the first lines is conducted to a corresponding transistor to measure the capacitance at the corresponding cross location.

4. The method according to claim 3, wherein in the display phase, at least one of the first lines is conducted to a corresponding driver to drive the corresponding display unit to display.

5. A touch screen, comprising:

a plurality of first lines;

a plurality of second lines, each first line and each second line being insulated from each other and crossing each other at a corresponding cross location;

a plurality of display electrodes, each coupled to one of the first lines and one of the second lines; and a common voltage conductive layer, overlaying the display electrodes, comprising a plurality of holes, wherein positions of the holes are associated with the cross locations.

6. The touch screen according to claim 5, wherein a planar projection of each hole is at least partially overlapped with a planar projection of at least one of the cross locations.

7. A control system, for controlling a display panel comprising a plurality of first lines, a plurality of second lines and a plurality of display units, each first line and each second line being insulated from each other while crossing each other at a corresponding cross location, each display unit being coupled to one of the first lines and one of the second lines; the control system comprising:

a plurality of capacitance sensing units, each corresponding to one of the first lines; wherein, when each capacitance sensing unit is conducted to the corresponding first line, the capacitance sensing unit senses capacitance at least one of the cross locations corresponding to the corresponding first line;

a plurality of drivers, each corresponding to at least one of the first lines; wherein, when each driver is conducted to the corresponding first line, said each driver drives at least one of the display units coupled to the corresponding first line; and a plurality of switch circuits, each coupled to one of the first lines, for respectively conducting the first lines to the capacitance sensing units in a sensing phase, and respectively conducting the first lines to the drivers in a display phase.

8. The control system according to claim 7, wherein each display unit comprises a transistor, and the transistor is controlled by the corresponding second line corresponding to said each display unit to selectively conduct said each display unit to the corresponding first line.

9. The control system according to claim 8, further comprising:

a plurality of second drivers, each corresponding to at least one of the second lines;

a plurality of auxiliary units, each corresponding to at least one of the second lines; and a plurality of second switch circuits, each being coupled to at least one of the second lines.

10. The control system according to claim 9, wherein the second switch circuits respectively conduct the second lines to the second drivers in the display phase to turn on the transistors, and respectively conduct the second lines to the corresponding auxiliary units in the sensing phase to turn off the transistors.

* * * * *